United States Patent [19]
Chronister

[11] Patent Number: 5,042,776
[45] Date of Patent: Aug. 27, 1991

[54] INTERNAL TANK VALVE

[75] Inventor: Clyde H. Chronister, Houston, Tex.

[73] Assignee: Chronister Valve Corporation, Houston, Tex.

[21] Appl. No.: 408,834

[22] Filed: Sep. 18, 1989

[51] Int. Cl.⁵ .................................. F16K 51/00
[52] U.S. Cl. ................... 251/144; 137/347; 251/98; 251/293
[58] Field of Search ........... 251/144, 287, 293, 299, 251/85, 90, 98; 137/347, 351

[56] References Cited
U.S. PATENT DOCUMENTS

| | | | |
|---|---|---|---|
| 1,491,077 | 4/1924 | Beerworth | 251/293 |
| 3,182,951 | 8/1965 | Spencer | 251/85 |
| 3,531,083 | 9/1970 | Rohrer | 251/287 |
| 3,963,211 | 6/1976 | Myers | 251/85 |
| 4,137,935 | 2/1979 | Snowdon | 251/144 |
| 4,180,242 | 12/1979 | Reedy | 137/247 |

FOREIGN PATENT DOCUMENTS 0021885 1/1981 European Pat. Off. .............. 251/98

Primary Examiner—A. Michael Chambers
Attorney, Agent, or Firm—Fulbright & Jaworski

[57] ABSTRACT

An internal tank valve for a tank having an opening of a valve seat supported from the tank, a valve element support connected to the valve seat and extending into the interior of the tank, and a sealing valve element inside of said tank rotatably supported from the valve support for coacting with the valve seat for opening and closing the valve. A valve operator is supported from the tank and extends to and is connected to the seating element and extends to the outside of the tank and includes means for rotating the sealing valve element. The internal valve and operator may be repaired and replaced from outside of the tank.

12 Claims, 3 Drawing Sheets

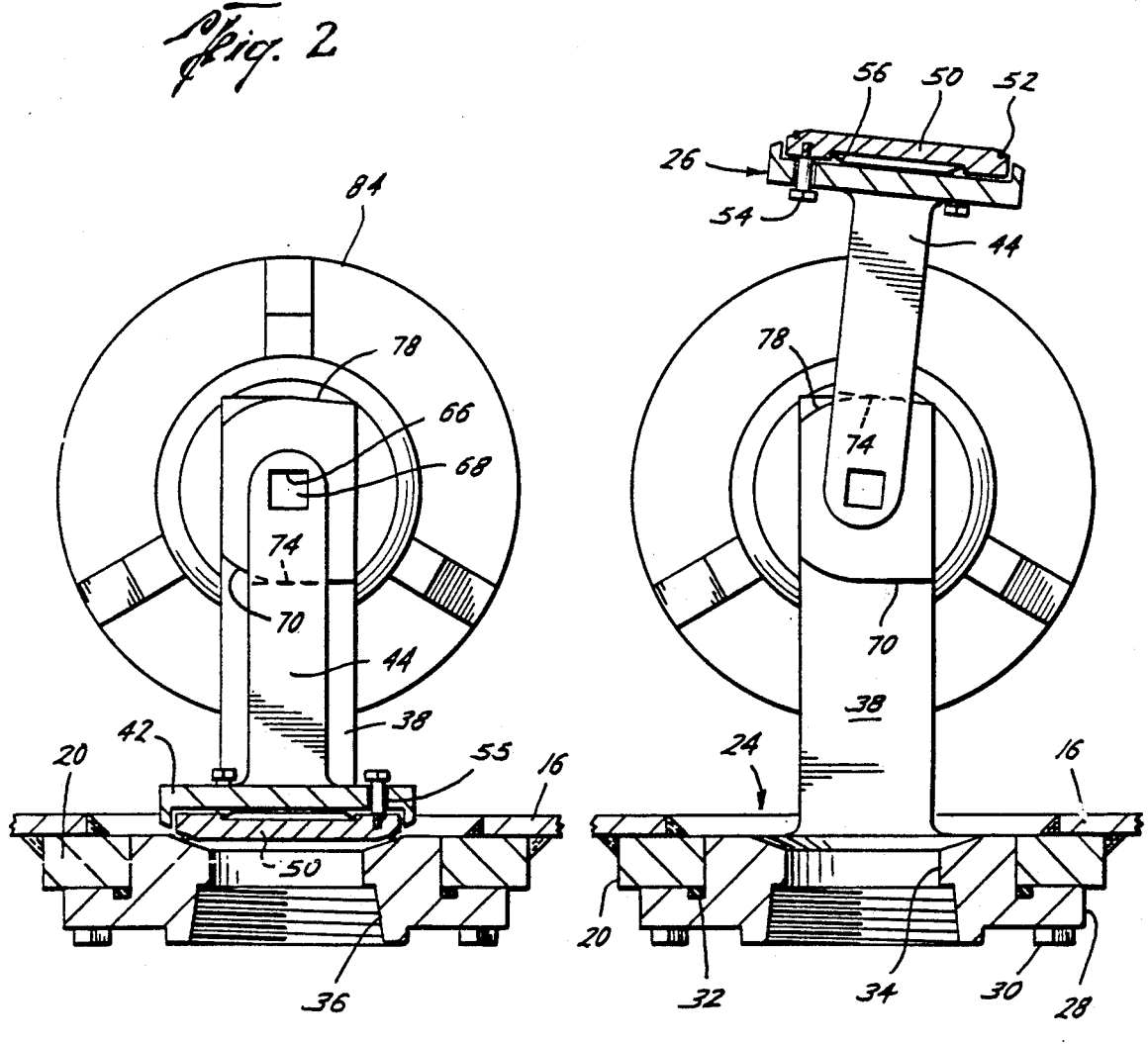

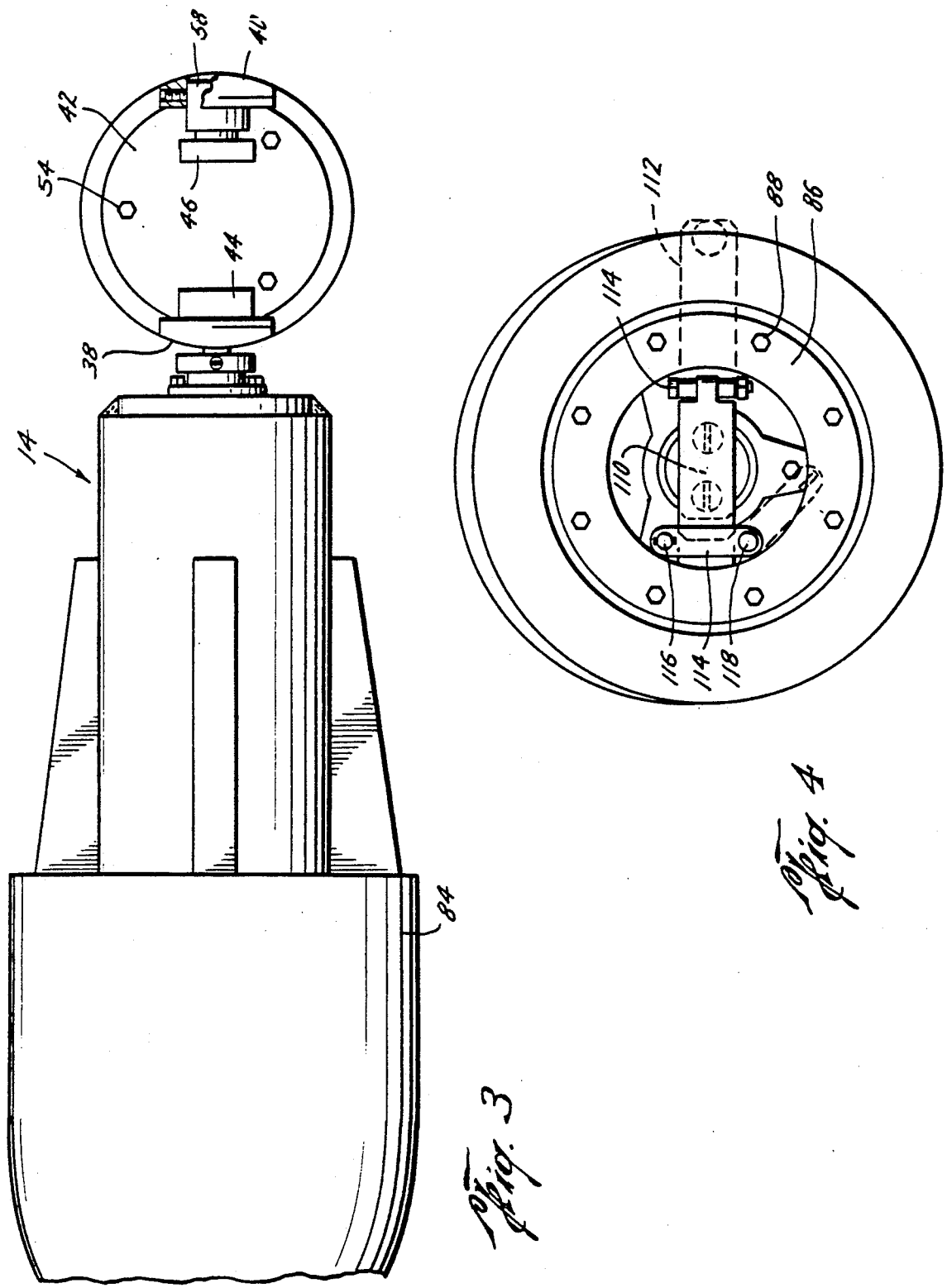

INTERNAL TANK VALVE

BACKGROUND OF THE INVENTION

The present invention is directed to a valve that can be used for loading or unloading tanks, for example, railroad tank cars, truck tanks, stationary tanks or other types of tanks handling liquids, gases or slurries. The present valve is adapted to be installed inside of the tank and is usually located at the top and/or bottom of the tank for loading and unloading tanks.

Present day tank valves generally have a valve and operator mounted outside of the tank and are subject to being damaged. And such valves are expensive and complicated.

The present invention is directed to a tank valve and operator, both of which may be positioned internally of the tank and therefore are less subject to being damaged. In addition, the present internal valve may be conveniently installed from the exterior, easily removed for repair or replacement, and may be retrofitted to existing tanks. In particular, the present internal valve is particularly advantageous for railroad tank cars which are subjected to vibrations and shocks.

SUMMARY

The present invention is directed to an internal valve for a tank having an opening and includes a valve seat having a passageway and which is supported from the tank and positioned in the tank opening. A valve element support is connected to the valve seat and extends into the interior of the tank and a sealing valve element is positioned inside of the tank and is rotatably supported from the valve element support for coacting with the valve seat for opening and closing the passageway. A valve operator is supported from the tank and extends to and is connected to the sealing valve element. The operator is exposed to the exterior of the tank and includes means for rotating the sealing valve element between open and closed positions. The valve seat and the operator are insertable through openings in the tank and are secured to the outside of the tank.

Another object of the present invention is wherein the valve element support includes first and second spaced arms and the sealing valve element includes third and fourth arms pivotally connected to the first and second arms, respectively. Preferably, open and close position stop shoulders are positioned between the arms of the valve element support and the arms of the sealing valve element.

Yet a further object is wherein the sealing valve element includes a holder and a sealing disc loosely carried by the holder and spring means between the holder and disc for biasing the sealing disc onto the valve seat.

A still further object is wherein the third and fourth arms of the valve element are pivotally connected to the first and second arms of the valve support through rotatable connections, and the valve operator rotates the sealing valve element through one of the connections.

A still further object of the present invention is wherein the valve operator is telescopically retractable into and out of the tank for ease of operation. Preferably, the valve operator includes a foldable operating handle that may be recessed in the operator.

Yet a further object is wherein the longitudinal axis of the valve operator is perpendicular to the longitudinal axis of the sealing valve element and a non-circular slidable coacting connection is provided between the valve operator and the sealing valve element.

Other and further objects, features and advantages will be apparent from the following description of a presently Preferred embodiment of the invention, given for the purpose of disclosure and taken in conjunction with the accompanying drawings.

BRIEF DESCRIPTION OF THE DRAWINGS

FIG. 2 is a cross section taken along the line 2—2 of FIG. 1 showing the valve in the closed position, FIG. 2A is a view similar to FIG. 2 showing the valve in the open position, FIG. 3 is a top view taken along the line 3—3 of FIG. 1, and FIG. 4 is a cross-sectional view taken along the line 4—4 of FIG. 1.

DESCRIPTION OF THE PREFERRED EMBODIMENT

Figure 1:
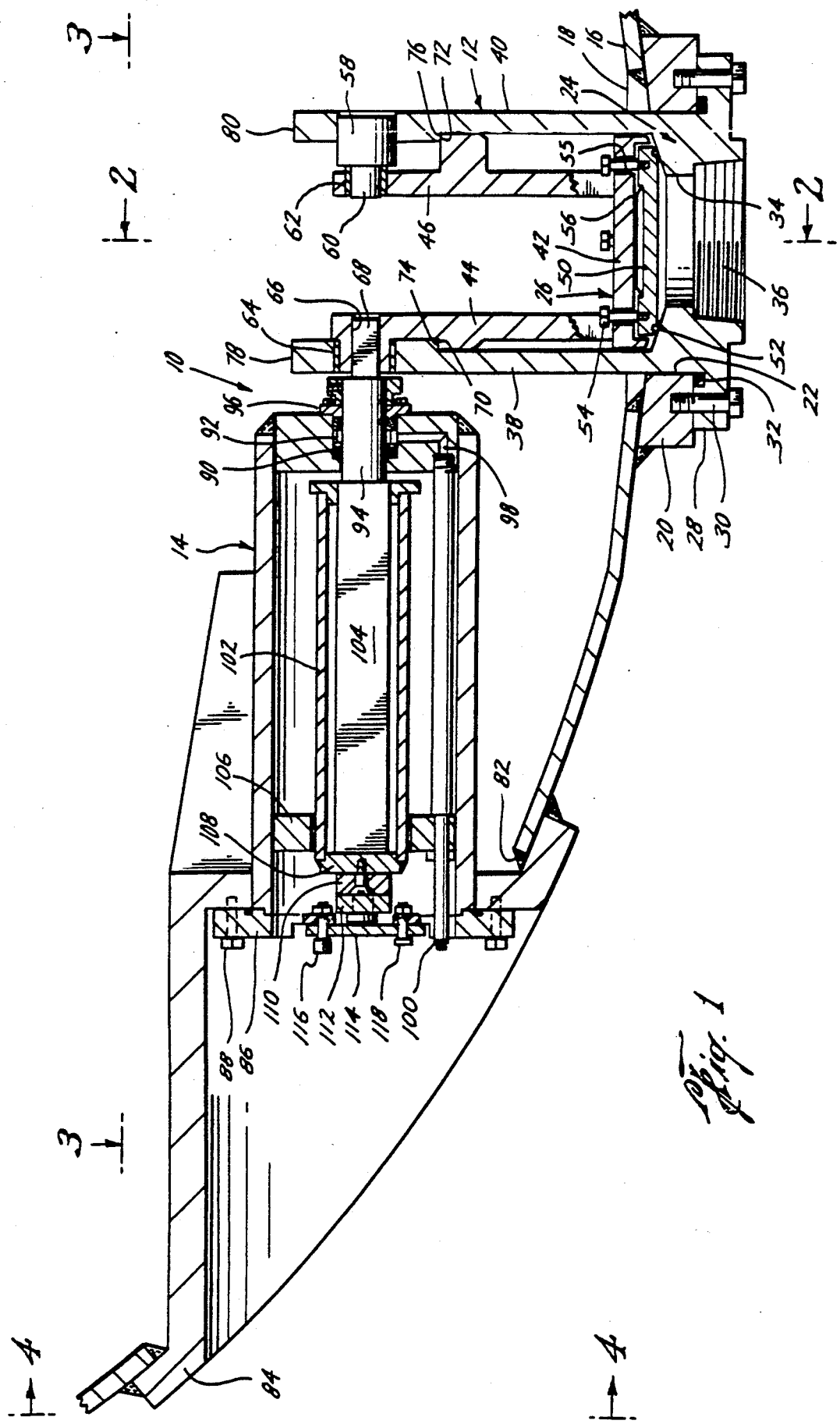
FIG. 1 is an elevational view, in cross section, illustrating the present invention in use in a tank.

Referring now to the drawings, the reference numeral 10 generally indicates the internal tank valve of the present invention and generally includes a main valve body generally indicated by the reference numeral 12, and a valve operator generally indicated by the reference numeral 14. The valve 10 is adapted to be installed inside of a tank 16, for example, a railroad tank car that is approximately 86 inches in diameter. However, the present internal valve 10 can be installed on other and various types of tanks of various sizes. In addition, the valve 10 may be installed and repaired from the exterior of new or used tanks easily, quickly and can be adapted for various sized tank openings.

A hole 18 is cut in the tank 16, or an existing hole is used, large enough for the main valve body 12 to be installed. A tank flange 20 is welded to the exterior of the tank 16 and provides a main valve body receiving hole 22 for allowing the insertion and removal of the main body 12. The main valve body 12 includes a valve seat 24 and a sealing valve element 26. A valve flange 28 connected to the valve seat 24 is attached to the tank flange 20 by a plurality of studs 30 and a seal 32 is provided between the valve flange 28 and tank flange 20. The valve seat 24 also includes a passageway 34 which may have a suitable connection such as a threaded connection, either male or female, here shown as female threads 36 for connection to a conduit for supplying fluid to or from the tank 16. The valve seat 24 also includes a first 38 and a second 40 stationary spaced arms extending into the interior of the tank 16.

The sealing valve element 26 includes a holder 42, which is connected to a third 44 and a fourth movable arm 46 which are in turn pivotally connected to the first arm 38 and the second arm 40, respectively. The sealing valve element 26 also includes a sealing disc 50 having a seat seal 52 for coacting with the valve seat 24. Preferably, the sealing disc 50 is loosely carried from the holder 42 by a plurality of bolts 54 positioned in oversized holes 55 in the holder 42 which allow a small amount of movement in all directions between the disc 50 and the holder 42. Suitable biasing means such as a bellville spring 56 is provided between the holder 42 and the disc 50 for yieldably urging the disc 50 onto the valve seat 24. Thus, the sealing disc 50 is not held rigidly against the valve seat, but is allowed to withstand shocks and vibration while still maintaining a closed position due to the action of the spring 56 and/or the action of the material in the tank acting against the back side of the disc 50. Preferably, the sealing disc 50 is a sector of a sphere with the resilient seal 52 acting as the primary seal and the metal disc 50 providing a secondary metal-to-metal seal. The disc 50 may be operated with a low torque as compared with a ball valve because there is less area to resist movement through the product in the tank 16.

A trunnion 58 is provided in the arm 40 having a round pivot 60 connected to a bearing 62 in the arm 46 for allowing rotational movement of the arm 46 relative to the arm 40. A bearing 64 is provided between the arms 38 and 44 for allowing rotation between the sealing valve element 26 and the valve seat 24. However, the arm 44 includes a non-circular hole 66, such as a square hole into which a coacting square drive 68 of the operator 14 may be slidably installed and engaged. Rotation of the square drive 68 moves the valve element 26 from the closed position shown in FIGS. 1 and 2 to the open position shown in FIG. 2A. It is noted that the sector of a sphere disc 50 is rotated about an axis which is the center of a sphere. The axis of rotation is the longitudinal axis of the operator 14.

Referring now to FIGS. 1, 2 and 2A, coacting open and closed stop shoulders are positioned between the valve seat 24 and the valve element 50. Thus, shoulders 70 and 72 may be provided on the first arm 38 and second arm 40 of the valve seat unit 24 which coact with shoulders 74 and 76 on the arms 38 and 40, respectively, to provide coacting stop shoulders for positioning the valve element 26 in the closed position. When the valve element 26 is moved to the open position, the shoulders 74 and 76 on the arms 44 and 46, respectively, engage shoulders 78 and 80 on arms 38 and 40 respectively, for holding the valve in the open position.

Referring now to FIGS. 1, 3 and 4, the valve operator 14 is installed in the tank 16 through an opening 82 and supported from a mounting flange 84 which may be welded to the exterior of the tank 16. An operator flange 86 is connected to mounting flange 84 with operator mounting bolts 88. After the main valve body 12 is installed in place through the opening 18, the operator 14 may be installed and it is noted that the longitudinal axis of the valve operator 14 is perpendicular to the longitudinal axis of the main valve body 12 for allowing the square drive 68 to slidably engage and coact with the square opening 66 in the arm 44.

Packing 90 and lantern ring 92 is maintained in place around circular stem 94 by a packing gland 96. A passageway 98 is provided between a head fitting 100 and the lantern ring 92 for providing a sealant if desired.

A stem extension 102 is telescopically positioned on the stem drive 104 which has a round sectional area with a flat surface on the top and bottom. The stem extension 102 may move outwardly or inwardly on the stem drive 104 to lengthen the valve operator to provide enough clearance to rotate the square drive 68 from outside of the tank 16. The telescoping stem extension is stopped in its outward position by the extension stop 106. When the extension 102 is pushed inwardly into the non-operating position, it is stopped by the end plate 108 contacting the end of the stem drive 104.

Referring now to FIGS. 1 and 4, an operator handle 110 is attached to the end Plate 108 of the telescoping stem body 102. An operator handle extension 112 is attached to the handle 110 by a hinge pin 114 so that the handle extension 112 may be extended for manually rotating and operating the operator 14, but can be folded over for storage in a non-operating position. The entire operator 14 may be placed in a non-operating position by a lock lever 114 and by a lever locking nut 116. The locking lever 114 is free to move around in pin 118 into a locked and unlocked position.

In operation, openings 18 and 82 may be made in the tank 16, and the main valve unit 12 is first installed. Thereafter, the operator 14 is installed with the square drive 68 slidably engaging the opening 66 in the arm 44. It is noted that both the main body unit 12 and the operator 14 is positioned internally of the tank 16 and protected against accidental breakage. When it is desired to move the valve element 26 between an open and closed position, the lock lever 114 is unlatched, the stem extension 102 is extended, the operator handle extension 112 is folded outwardly and the operating shaft 104 is manually rotated 180 degrees to move the valve element 26 to the desired position against a stop. Thereafter, the operator is again placed in the retracted position.

The present invention has the additional advantages (1) that the valve body 12 and operator 14 are positioned completely inside the railroad tank 16 and above and away from the shear point. If the railroad tank car goes off the track, the valve 10 is shielded from damage to and spillage from the valve 10, (2) the tank 16 may be totally drained because there are no recesses or voids to trap any of the product, (3) the valve may be of special alloys to suit the carried product and can be installed after the tank is coated, and (4) the product in the valve 10 remains the same consistency and the same temperature as the product in the tank and thus no special equipment such as steam hoses is required.

The present invention, therefore, is well adapted to carry out the objects and attain the ends and advantages mentioned as well as others inherent therein. While a presently preferred embodiment of the invention has been given for the purpose of disclosure, numerous changes in the details of construction, will be readily apparent to those skilled in the art and which are encompassed within the spirit of the invention and the scope of the appended claims.

What is claimed is:

1. An internal valve for a mobile tank car having an opening comprising,
    a valve seat having a passageway supported from the tank and positioned in the tank opening,
    a valve element support connected to the valve seat and extending into the interior of the tank,
    a sealing valve element positioned inside of said tank and rotatably supported form the valve element support for coacting with the valve seat for opening and closing said passageway, and
    a valve operator supported from the tank and extending to and releasably connected to the sealing valve element, said operator positioned inside the tank but exposed to the exterior of the tank, and including means for rotating the sealing valve element.

2. The valve of claim 1 wherein the valve element support is insertable through the tank opening and is secured to the outside of the tank.

3. The valve of claim 1 wherein the valve element support includes first and second spaced arms and the sealing valve element includes third and fourth arms rotatably connected to first and second arms respectively, all of said arms positioned in the tank.

4. The valve of claim 3 including,
   open and close stop shoulders positioned between the arms of the valve element support and the arms of the sealing valve element.

5. The valve of claim 1 wherein the sealing valve element includes a holder and a sealing disc loosely carried by the holder, and spring means between the holder and disc.

6. The valve of claim 3 wherein the third and fourth arms are connected to the first and second arms through rotatable connections, and the valve operator rotates the sealing valve element through one of the arms of the sealing valve element.

7. The valve of claim 1 wherein the valve operator is telescopically retractable into and out of the tank.

8. The valve of claim 7 wherein the valve operator includes a foldable operating handle that may be recessed and locked in the operator.

9. The valve of claim 1 wherein the longitudinal axis of the valve operator is perpendicular to the longitudinal axis of the sealing valve element.

10. The valve of claim 1, including,
    a non-circular disconnectable slidable coacting connection between the valve operator and the sealing valve element.

11. The valve of claim 5 wherein the sealing disc is a sector of a sphere.

12. An internal valve for a mobile tank car having an opening comprising,
    a valve seat having a passageway, said seat insertable in and positioned in the tank opening and secured to the outside of the tank,
    a valve element support connected to the valve seat and extending into the interior of the tank,
    a sealing valve element positioned inside of the tank rotatably supported form the valve element support for coacting with the valve seat for opening and closing said passageway,
    a valve operator secured to and supported form the outside of the tank and positioned inside the tank and extending to and releasably connected to the sealing valve element, and including means for rotating the sealing valve element,
    the longitudinal axis of the valve operator being perpendicular to the longitudinal axis of the sealing valve element and extendable through the side of the tank,
    a non-circular slidable coacting connection between the valve operator and the sealing valve element allowing and internal connection to be made and provide rotation of the valve element by the operator.

* * * * *

UNITED STATES PATENT AND TRADEMARK OFFICE
CERTIFICATE OF CORRECTION

PATENT NO. : 5,042,776
DATED : August 27, 1991
INVENTOR(S) : Clyde H. Chronister It is certified that error appears in the above-indentified patent and that said Letters Patent is hereby corrected as shown below:

Column 2, line 5, change "Preferred" to --preferred --.
Column 6, line 25, delete "and" and insert --an --.

Signed and Sealed this

Twenty-sixth Day of October, 1993

Attest:

BRUCE LEHMAN

*Attesting Officer*  *Commissioner of Patents and Trademarks*